(12) United States Patent
Dai et al.

(10) Patent No.: US 12,099,182 B2
(45) Date of Patent: Sep. 24, 2024

(54) COLOR WHEEL, LIGHT SOURCE SYSTEM AND DISPLAY DEVICE

(71) Applicant: APPOTRONICS CORPORATION LIMITED, Guangdong (CN)

(72) Inventors: Dayan Dai, Guangdong (CN); Hao Zhou, Guangdong (CN); Xia Song, Guangdong (CN); Yi Li, Guangdong (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 498 days.

(21) Appl. No.: 17/415,459

(22) PCT Filed: Nov. 18, 2019

(86) PCT No.: PCT/CN2019/119135
§ 371 (c)(1),
(2) Date: Jun. 17, 2021

(87) PCT Pub. No.: WO2020/125300
PCT Pub. Date: Jun. 25, 2020

(65) Prior Publication Data
US 2022/0075177 A1  Mar. 10, 2022

(30) Foreign Application Priority Data

Dec. 17, 2018 (CN) .......................... 201811545020.1

(51) Int. Cl.
*G02B 26/00* (2006.01)
*G03B 21/20* (2006.01)
*H04N 9/31* (2006.01)

(52) U.S. Cl.
CPC ......... *G02B 26/008* (2013.01); *G03B 21/204* (2013.01); *G03B 21/2066* (2013.01); *H04N 9/3114* (2013.01); *H04N 9/3164* (2013.01)

(58) Field of Classification Search
None
See application file for complete search history.

(56) References Cited

U.S. PATENT DOCUMENTS

2007/0146916 A1  6/2007  Yang et al.
2013/0258639 A1* 10/2013  Hu ..................... G03B 21/2066
                                                              362/84

FOREIGN PATENT DOCUMENTS

CN  102591119  7/2012
CN  104597698  5/2015
(Continued)

OTHER PUBLICATIONS

International Search Report for PCT/CN2019/119135, mailed Feb. 12, 2020.

*Primary Examiner* — Samira Monshi
(74) *Attorney, Agent, or Firm* — NIXON PEABODY LLP; Jeffrey L. Costellia

(57) ABSTRACT

Provided is a color wheel. The color wheel includes a substrate, a conversion layer disposed on the substrate for wavelength conversion of incident light and obtaining irradiated laser, a first filter layer for filtering the irradiated laser to obtain a first light for modulating an image in a first color gamut range, and a second filter layer for filtering the irradiated laser to obtain a second light for modulating an image in a second color gamut range. Planes, in which the light incident surface of the conversion layer, the light incident surface of the first filter layer and the light incident surface of the second filter layer are located respectively, are parallel or coincide with each other.

17 Claims, 11 Drawing Sheets

(56) References Cited

FOREIGN PATENT DOCUMENTS

| | | |
|---|---|---|
| CN | 105353578 | 2/2016 |
| CN | 205374967 | 7/2016 |
| CN | 107608016 | 1/2018 |

\* cited by examiner

COLOR WHEEL, LIGHT SOURCE SYSTEM AND DISPLAY DEVICE

TECHNICAL FIELD

The present disclosure relates to the field of display technologies, and in particular, to a color wheel, a light source system and a display device.

BACKGROUND

This part is intended to provide background or context for specific implementations of the present disclosure in the claims. The description herein is not recognized as the prior art by virtue of being illustrated in this part.

Referring to FIG. 1, a laser fluorescence source 100 in the prior art needs to generate fluorescence of red, green, blue or more colors. In a commonly used method, different phosphors are coated on a color wheel, an exciting light source 110 generates exciting light, to irradiate and excite a conversion layer 183 provided with a phosphor on a color wheel 180 to generate fluorescence, and a motor is driven to rotate to generate fluorescence of different colors emitted in time sequence. The fluorescence has a relatively broad optical spectrum, and a wavelength range thereof exceeds a desired target. Therefore, a filter 185 is required to filter the fluorescence. At present, a commonly used manner is to add a filter 185 on an inner side or an outer side of a fluorescence wheel. In a general design, a circle of color wheel rings is used, in accordance with a requirement of only one color gamut. Such a system can emit primary color light meeting a requirement of only one color gamut, and cannot meet requirements of multiple types of gamut, resulting in relatively great application limitations.

SUMMARY

A first aspect of the present disclosure provides a color wheel, the color wheel includes a substrate, a conversion layer, a first filter layer, and a second filter layer, and the conversion layer, the first filter layer, and the second filter layer are disposed on the substrate. The conversion layer is configured to perform wavelength conversion on incident light to obtain excited light, the first filter layer is configured to filter the excited light to obtain first light for modulating an image in a first color gamut range, and the second filter layer is configured to filter the excited light, to obtain second light for modulating an image in a second color gamut range. A plane of a light incident surface of the conversion layer, a surface of a light incident surface of the first filter layer, and a surface of a light incident surface of the second filter layer are parallel to or overlap with each other.

Further, the second color gamut range covers the first color gamut range and has a part beyond the first color gamut range.

Further, each of the first filter layer and the second filter layer includes a plurality of sections, each of the plurality of sections is configured to filter excited light of a same color to obtain first light or second light of a corresponding color, a bandwidth of a transmittance rate curve of one of the plurality of sections of the first filter layer configured to filter excited light of a same color is a first bandwidth, a bandwidth of a transmittance rate curve of one of the plurality of sections of the second filter layer configured to filter excited light of a same color is a second bandwidth, and the first bandwidth is wider than the second bandwidth.

Further, a reflective layer for reflecting light is provided between the conversion layer and the substrate.

Further, the substrate has an annular shape, and includes a top surface provided with the conversion layer and the reflective layer, and an inner side wall and an outer side wall that are connected to the top surface and the inner side wall and the outer side wall are opposite to each other.

Further, each of the first filter layer and the second filter layer includes a first section for filtering first color light in the excited light, and a central angle of the first section of the first filter layer is not equal to a central angle of the first section of the second filter layer.

Further, the first filter layer is disposed in a region enclosed by the inner side wall of the substrate, and the second filter layer is disposed on a periphery of the outer side wall of the substrate.

Further, the color wheel further includes a driving unit disposed on a surface of the first filter layer facing away from the conversion layer and configured to drive the color wheel to rotate periodically.

Further, the conversion layer includes a first conversion layer configured to emit first excited light and a second conversion layer configured to emit second excited light. The first light is obtained by filtering the first excited light by the first filter layer. The second light is obtained by filtering the second excited light by the second filter layer.

Further, the first conversion layer is closer to the first filter layer than the second conversion layer.

Further, each of the first conversion layer and the second conversion layer includes a first section for emitting the first color light, a central angle of the first section of the first conversion layer is equal to the central angle of the first section of the first filter layer, and a central angle of the first section of the second conversion layer is equal to the central angle of the first section of the second filter layer.

Further, the central angle of the first section of the first conversion layer and the central angle of the first section of the first filter layer are symmetrically arranged with respect to a geometric center of the substrate, and the central angle of the first section of the second conversion layer and the central angle of the first section of the second filter layer are symmetrically arranged with respect to the geometric center of the substrate.

A second aspect of the present disclosure provides a light source system. The light source system includes: an exciting light source configured to emit exciting light; the above color wheel, where the exciting light irradiates the conversion layer to obtain the excited light; and a mirror configured to move to a first position or a second position based on a movement signal. When the mirror is located at the first position, the mirror guides the excited light to be incident to the first filter layer to obtain the first light; and when the mirror is located at the second position, the mirror guides the excited light to be incident to the second filter layer to obtain the second light.

A third aspect of the present disclosure provides a light source system. The light source system includes: an exciting light source configured to emit exciting light; the above color wheel, where the exciting light irradiates the conversion layer to obtain the excited light; and a guiding assembly configured to guide the excited light to be incident to the first filter layer or the second filter layer. The color wheel further moves to a first position or a second position based on a movement signal. When the color wheel is located at the first position, the guiding assembly guides the excited light to be incident to the first filter layer to obtain the first light. When the color wheel is located at the second position, the guiding assembly guides the excited light to be incident to the second filter layer to obtain the second light.

Further, the light source system further includes a supplementary light source for emitting supplementary light, where the supplementary light is emitted from the light source system along a same optical path as the first light and the second light.

A fourth aspect of the present disclosure provides a light source system. The light source system includes: an exciting light source configured to emit exciting light; the above color wheel; and a guiding assembly configured to guide the exciting light to irradiate the conversion layer, and guide the excited light to be incident to the first filter layer or the second filter layer. The color wheel further moves to a first position or a second position based on a movement signal. When the color wheel is located at the first position, the guiding assembly guides the exciting light to irradiate the first conversion layer to obtain the first excited light, and guides the first excited light to be incident to the first filter layer to obtain the first light. The color wheel is located at the second position, the guiding assembly guides the exciting light to irradiate the second conversion layer to obtain the second excited light, and guides the second excited light to be incident to the second filter layer to obtain the second light.

A fifth aspect of the present disclosure provides a display device. The display device includes: a control apparatus configured to transmit a movement signal based on a trigger signal and transmit a modulation signal based on image data of each of frames of image to be displayed; the above light source system configured to emit the first light or the second light based on the movement signal; and a light modulation apparatus configured to modulate the first light or the second light based on the modulation signal to obtain image light of the image to be displayed.

The color wheel provided in the present disclosure can filter excited light to obtain primary color light meeting requirements of two types of color gamut. This helps the light source system to flexibly control, according to color gamut information of each of frames of image to be displayed, the color wheel to emit primary color light for modulating different types of color gamut, so that different viewing effects can be achieved, thereby greatly improving user experience.

BRIEF DESCRIPTION OF THE DRAWINGS

To describe the technical solutions in the embodiments/implementations of the present disclosure more clearly, the following briefly describes the accompanying drawings required for describing the embodiments/implementations. Apparently, the accompanying drawings in the following description show merely some embodiments/implementations of the present disclosure, and a person of ordinary skill in the art can further derive other drawings from these accompanying drawings without creative efforts.

REFERENCE NUMERALS OF PRIMARY COMPONENTS

Figure 1:
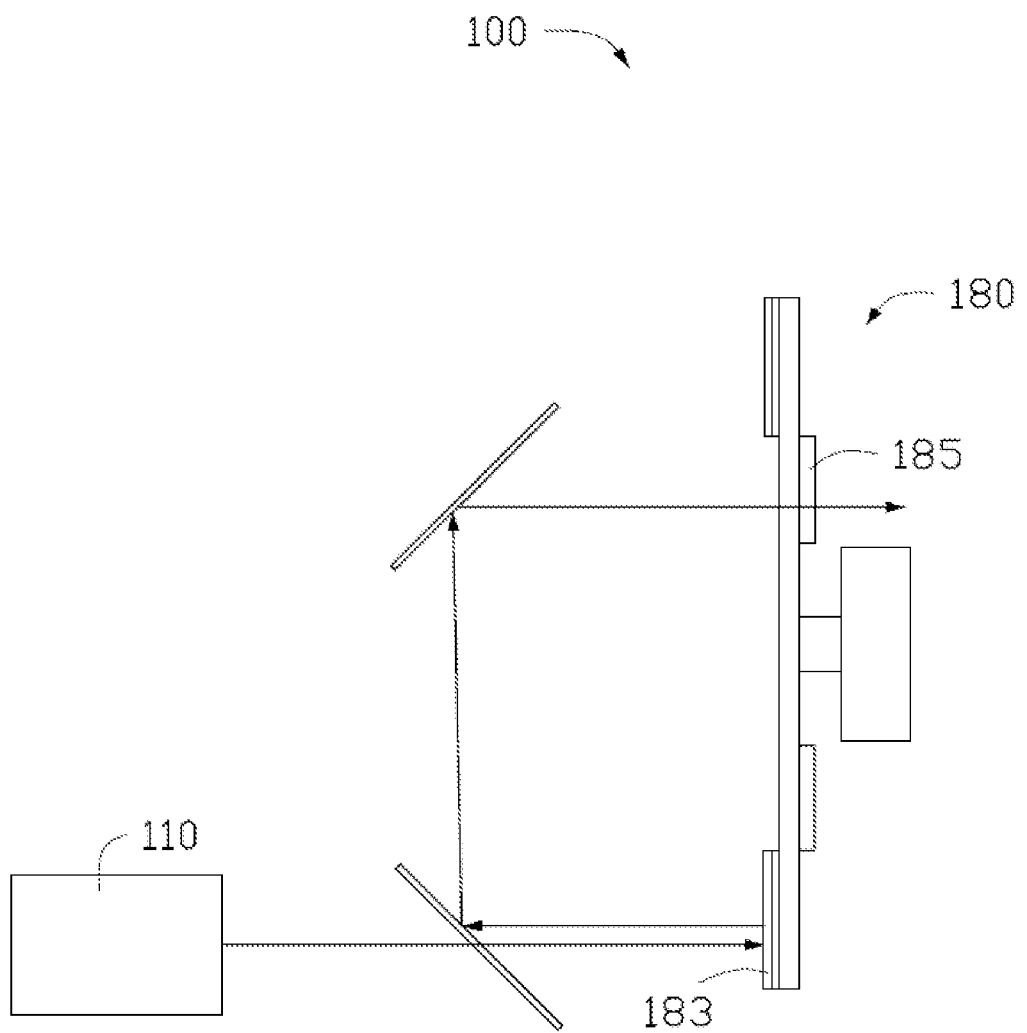
FIG. 1 is a schematic diagram of a laser fluorescence source in the prior art.

Laser fluorescence source 100
Display device 20
Light source system 200, 300, 400, 500
Exciting light source 110, 210
Guiding assembly 260, 460
Mirror 265
Color wheel 180, 280, 380, 480, 580
Substrate 281, 381, 481, 581
Top surface 281a, 581a
Inner side wall 281b, 381b
Outer side wall 281c
Reflective layer 282, 582
Conversion layer 183, 283, 383, 483, 583
First conversion layer 483a
Second conversion layer 483b
First section R, R1, R2, R'
Second section G, G1, G2, G'
Third section Y, Y1, Y2, Y'
Fourth section B, B1, B2, B'
Filter 185
First filter layer 285, 385, 485, 585
Second filter layer 286, 386, 486, 586
Antireflection film 388
Driving unit 289, 389
Homogenizing apparatus 290, 390
First position M, P
Second position N, Q
Control apparatus 800
Light modulation apparatus 900

The present disclosure is further described in the following detailed description with reference to the accompanying drawings.

DETAILED DESCRIPTION

To make the objectives, features and advantages of the present disclosure more comprehensible, the present disclosure is described in detail below with reference to the accompanying drawings and specific embodiments. It should be noted that without conflict, the embodiments of this application and features of the embodiments can be combined with each other.

Many specific details are set forth in the following description to facilitate a full understanding of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Unless otherwise defined, all technical and scientific terms used herein have the same meaning as commonly understood by those skilled in the technical field of the present disclosure. The terms used in the specification of the present disclosure herein are only for the purpose of describing specific embodiments, and are not intended to limit the present disclosure.

The present disclosure provides a color wheel that can emit light for modulating images of two types of color gamut. The color wheel provided in the present disclosure can be applied to a light source system of a display device.

Figure 2:
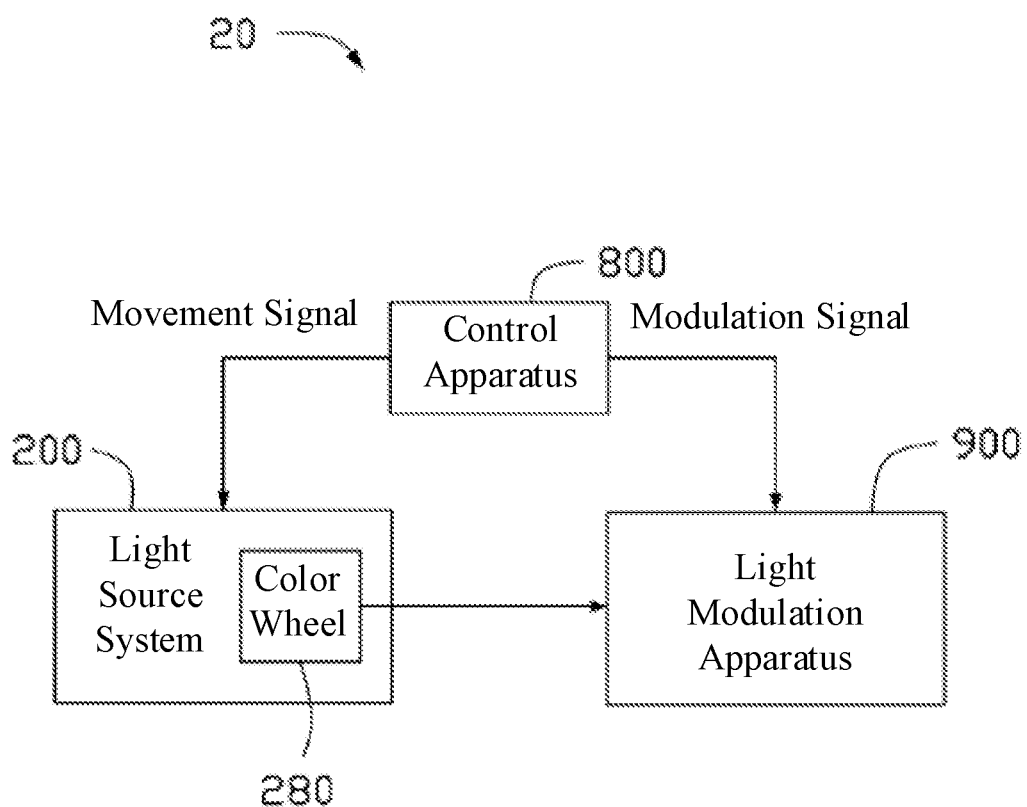
FIG. 2 is a schematic diagram of a display device according to a preferred implementation of the present disclosure.

Referring to FIG. 2, a display device 20 includes a light source system 200, a control apparatus 800 and a light modulation apparatus 900. The control apparatus 800 is configured to transmit a movement signal according to a trigger signal, and transmit a modulation signal according to image data of each of frames of an image to be displayed. The light source system 200 is configured to control, according to the movement signal, a color wheel 280 to emit first light for modulating an image in a first color gamut range or second light for modulating an image in a second color gamut range. The light modulation apparatus 900 is configured to modulate the first light or the second light according to the modulation signal, to obtain image light of the image to be displayed. The light source system 200 including a color wheel 280 can emit, according to color gamut information of each of frames of an image to be displayed, light (primary color light) for modulating different types of color gamut, so that the display device 20 reaches different viewing effects according to image data of different types of color gamut, thereby greatly improving user experience.

Figure 3:
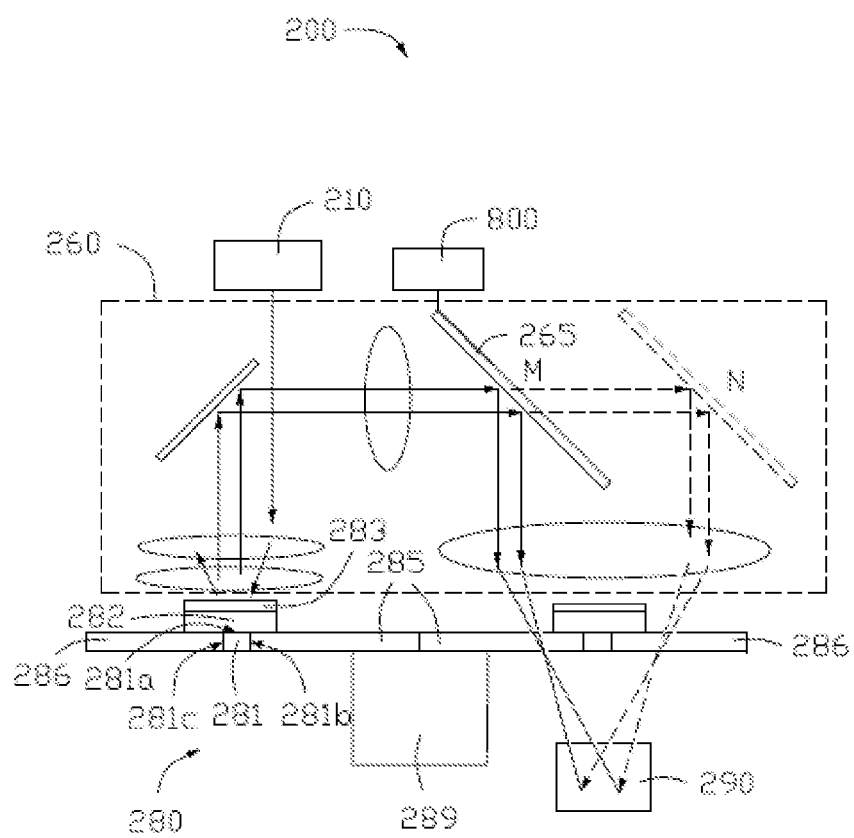
FIG. 3 is a schematic diagram of a light source system and a control apparatus shown in FIG. 2 in a first implementation of the present disclosure.
Figure 4:
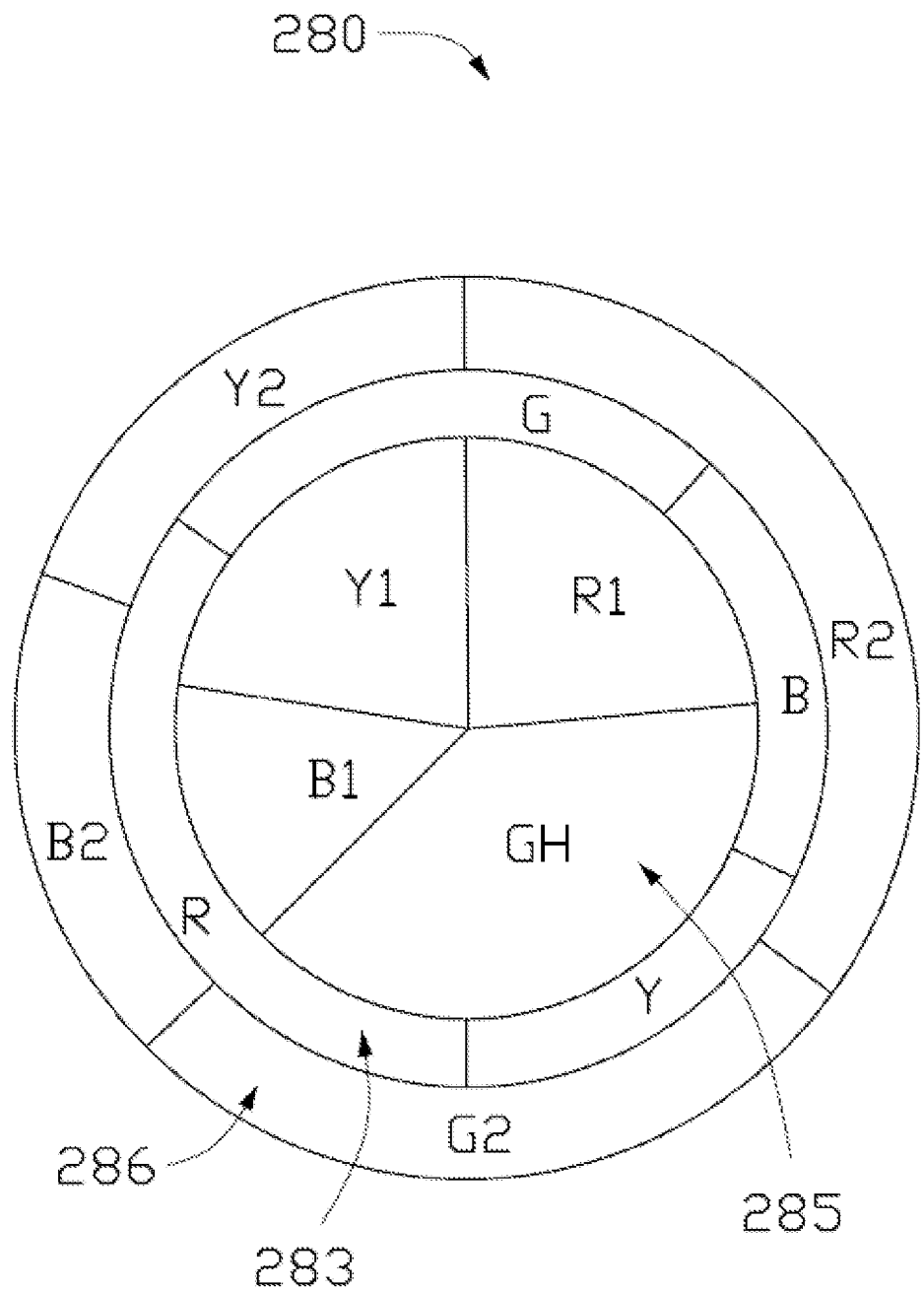
FIG. 4 is a schematic top view of a color wheel shown in FIG. 3.

Referring to FIG. 3 and FIG. 4, the control apparatus 800 is configured to transmit a movement signal according to a trigger signal. The light source system 200 includes an exciting light source 210, a mirror 265 and the color wheel 280. The exciting light source 210 is configured to emit exciting light, and the exciting light irradiates a conversion layer 283 of the color wheel 280 to obtain excited light. The mirror 265 is configured to move to a first position M or a second position N according to the movement signal. When the mirror 265 is located at the first position M, the mirror 265 guides the excited light to be incident to a first filter layer 285 to obtain first light. When the mirror 265 is located at the second position N, the mirror 265 guides the excited light to be incident to a second filter layer 286 to obtain second light. The exciting light source 210 can be a blue light source that emits blue exciting light. It can be understood that, the exciting light source 210 is not limited to the blue light source, and the exciting light source 210 can be a violet light source. In this implementation, a luminous body of the exciting light source 210 is a blue laser configured to emit blue laser light as the exciting light. In another implementation, the luminous body of the exciting light source 210 is a blue light-emitting diode. It can be understood that, the exciting light source 210 can include one laser, two lasers or a laser array. The specific number of the lasers of the exciting light source 210 can be selected according to an actual need. In an implementation, the exciting light source 210 further includes a homogenization device, to homogenize the exciting light. The homogenization device can be an optical integrator rod or a double fly-eye lens. It can be understood that, the homogenization device is not compulsorily required, especially in a miniaturized light source system.

As shown in FIG. 3 and FIG. 4, the color wheel 280 includes a substrate 281, the conversion layer 283, the first filter layer 285, and the second filter layer 286. The conversion layer 283, the first filter layer 285, and the second filter layer 286 are disposed on the substrate 281. The conversion layer 283 is configured to perform wavelength conversion on incident light to obtain excited light. The first filter layer 285 is configured to filter the excited light, to obtain first light for modulating an image in a first color gamut range. The second filter layer 286 is configured to filter the excited light, to obtain second light for modulating an image in a second color gamut range. In this implementation, a plane of a light incident surface of the first filter layer 285 and a plane of a light incident surface of the second filter layer 286 overlap. In other words, the light incident surface of the first filter layer 285 and the light incident surface of the second filter layer 286 are in a same plane, and a plane of a light incident surface of the conversion layer 283 is parallel to a plane of the light incident surface of the first filter layer 285 lies.

The color wheel 280 provided in the present disclosure can filter excited light to obtain primary color light meeting requirements of two types of color gamut. This helps the display device 20 flexibly control, according to color gamut information of each frame of an image to be displayed, the color wheel 280 to emit primary color light for modulating different types of color gamut, so that different viewing effects can be achieved, thereby greatly improving user experience.

In this implementation, a reflective layer 282 for reflecting light is further provided between the conversion layer 283 and the substrate 281. The reflective layer 282 can be a reflective film or a metal reflective material. In another implementation, the reflective layer 282 can be omitted, that is, the color wheel 280 is configured to transmit excited light and scattered exciting light.

Specifically, the substrate 281 is annular and includes a top surface 281a, an inner side wall 281b and an outer side wall 281c. The inner side wall 281b and the outer side wall 281c are connected to the top surface 281a. The inner side wall 281b and the outer side wall 281c are opposite to each other. The inner side wall 281b is closer to a geometric center of the substrate 281 than the outer side wall 281c. The conversion layer 283 and the reflective layer 282 are provided on the top surface 281a. The first filter layer 285 is connected to the inner side wall 281b of the substrate 281 and is disposed in a region enclosed by the inner side wall 281b. The second filter layer 286 is connected to the outer side wall 281c of the substrate 281 and is disposed on a periphery of the outer side wall 281c.

Specifically, the conversion layer 283 is provided with a wavelength conversion material, to perform wavelength conversion on exciting light with a relatively short incident wavelength, to obtain excited light of another color with a relatively long wavelength. The wavelength conversion material can be a phosphor, quantum dots, a phosphorescent material, or the like. The conversion layer 283 includes a first section R, a second section G, a third section Y and a fourth section B. The first section R is provided with a first-color wavelength conversion material, to generate first-color excited light under exciting of the exciting light. The second section G is provided with a second-color wavelength conversion material, to generate second-color excited light under exciting of the exciting light. The third section Y is provided with a third-color wavelength conversion material, to generate third-color excited light under exciting of the exciting light. The fourth section B is provided with a scattering material to scatter the exciting light, to obtain scattered exciting light as a fourth-color light for emission. Scattering the exciting light can alleviate or eliminate a speckle phenomenon caused by the laser light. In the present disclosure, a first color, a second color, a third color and a fourth color are red, green, yellow and blue, respectively. In another implementation, the first color, the second color, the third color and the fourth color can be other colors, respectively. For example, a yellow phosphor can be replaced with an orange phosphor to generate orange excited light, or the third section Y can be feasibly omitted.

The first filter layer 285 and the second filter layer 286 are each provided with sections for emitting color light that correspond to the sections of the conversion layer 283. As shown in FIG. 3, the first filter layer 285 includes a first section R1, a second section G1, a third section Y1 and a fourth section B1, for filtering red light, green light, yellow light and blue light emitted by the conversion layer 283, respectively. The second filter layer 286 includes a first section R2, a second section G2, a third section Y2 and a fourth section B2, for filtering red light, green light, yellow light and blue light filter emitted by the conversion layer 283, respectively. In an implementation, the fourth section B1 and the fourth section B2 are each provided with a scattering material to scatter incident blue exciting light, to alleviate a speckle phenomenon of laser light.

In the first filter layer 285 and the second filter layer 286, each section is provided with a filter of a corresponding color. The filter in the first filter layer 285 is used to filter the excited light to obtain first light for modulating an image in a first color gamut. The filter in the second filter layer 286 is used to filter the excited light to obtain second light for modulating an image in a second color gamut. The first color gamut range is different from the second color gamut range. For example, in the present disclosure, the second color gamut range covers the first color gamut range and has a part beyond the first color gamut range. The first color gamut range can be the Rec.709 standard color gamut, while the second color gamut range can be the DCI-P3 standard color gamut, and the DCI-P3 standard color gamut has more red and green ranges and can almost completely cover the Rec.709 standard. For any display device, a larger quantity of colors that can be displayed indicates a stronger capability of color performance. The DCI-P3 standard is completely higher than the Rec.709 standard.

Because the first color gamut range is different from the second color gamut range, correspondingly, bandwidths of transmittance rate curves of a section of the first filter layer and a section of the second filter layer that are used to filter excited light of a same color are a first bandwidth and a second bandwidth, respectively, and the first bandwidth is wider than the second bandwidth. For example, the first section R1 and the first section R2 are each used to filter red excited light and emit red light in the first color gamut range and the second color gamut range. Red first light emitted by the first section R1 covers a relatively small color gamut range, and a bandwidth of a transmittance rate curve of the filter provided in the first section R1 is relatively wide; and red first light emitted by the first section R2 covers a relatively large color gamut range, and a bandwidth of a transmittance rate curve of the filter provided in the first section R2 is relatively narrow, so as to emit red first light with relatively high color purity. Correspondingly, the transmittance rate curves of the filters provided in the sections of the corresponding color of the first filter layer 285 and the second filter layer 286 are also different, and can be flexibly selected according to requirements of different types of color gamut.

In different color gamut standards, to achieve white balance, different proportions of light amounts of different colors are required. Therefore, central angles of the sections of a corresponding color in the first filter layer 285 and the second filter layer 286 of the color wheel 280 are not equal to each other. As shown in FIG. 3, a central angle of the first section R1 is not equal to a central angle of the first section R2, and the central angle of the first section R2 is larger. That is, a second color gamut standard requires an increase in a proportion of red light. Correspondingly, for an emission proportion of light of another color, central angles of each section in the first filter layer 285 and the second filter layer 286 can also be flexibly set according to requirements of different color gamut standards.

As shown in FIG. 3, the color wheel 280 further includes a driving unit 289 disposed on a surface of the first filter layer 285 facing away from the conversion layer 283, and configured to drive the color wheel 280 to rotate periodically. Generally, the driving unit 289 can be a motor.

Further, the light source system 200 includes a guiding assembly 260. The guiding assembly 260 includes an optical component for guiding exciting light to the conversion layer 283 (such as a relay lens or other components), and the mirror 265 for guiding excited light to be incident to the first filter layer 285 or the second filter layer 286. The scattered exciting light is transmitted along a same optical path as the excited light. In an implementation, the mirror 265 is slidably mounted on a rail, and the control apparatus 800 controls the mirror 265 to slide on the rail to the first position M or the second position N. It can be understood that, the excited light can be incident to the mirror 265 through other mirrors or light splitting-combining elements.

In this implementation, the first filter layer 285 and the second filter layer 286 are disposed in a same plane, thereby ensuring that an external optical path of the color wheel 280 can be shared, simplifying the design of an internal optical path of the light source system 200, and reducing optical devices. In another implementation, the first filter layer 285 and the second filter layer 286 can be disposed in different planes, preferably, a plane of the first filter layer 285 and a plane of the second filter layer 286 are parallel to each other.

The light source system 200 further includes a homogenizing apparatus 290 disposed on a side of the color wheel 280 facing away from the exciting light source 210, and configured to homogenize light emitted by the first filter layer 285 and the second filter layer 286, to improve uniformity of light emitted by the light source system 200.

The color wheel 280 provided in this implementation emits light of a plurality of types of color gamut in a structure of one color wheel, and can flexibly switch color gamuts of the emitted light according to the movement signal of the control apparatus 800. In this case, there is no need to manufacture a plurality of color wheels, and an optical distance is relatively short. The color wheel 280 is located at a fixed position in the light source system 200, so that light energy utilization can be improved, and a volume of the optical path can be reduced, thereby improving user viewing experience.

In an implementation, the color wheel 280 provided in the present disclosure can be applied to a laser television. The trigger signal received by the control apparatus 800 is fixedly set to a first preset logic level, such as a high level; the control apparatus 800 transmits a movement signal according to the trigger signal of the first preset logic level, cause the color wheel 280 to always emit light in a one color gamut range, such as the Rec.709 color gamut range, so that the laser television projects images conforming an international standard of high-definition televisions.

It can be understood that, if the color wheel 280 provided by the present disclosure is applied to a cinema projector, the trigger signal received by the control apparatus 800 is fixedly set to a second preset logic level, such as a low level. The control apparatus 800 transmits a movement signal according to the trigger signal of the second preset logic level, cause the color wheel 280 to always emit light in one color gamut range, such as the DCI-P3 color gamut range, so that the cinema projector projects images conforming an international standard of digital cinemas.

In an implementation, the color wheel 280 is applied to a display device. The display device can be an education projector, a laser television, a micro projector, a cinema projector, a spliced-wall or engineering projector. The display device includes a housing and an input unit disposed on the housing. The input unit is electrically connected to the control apparatus 800. The input unit is configured to receive a user operation and transmit a corresponding trigger signal to the control apparatus 800. The input unit can be a key, a mouse, a keyboard or a touch unit that can receive a user operation. In an implementation, an input power supply can be omitted from a surface of the display device. The control apparatus 800 is wirelessly connected to an external terminal device, and receives a trigger signal transmitted by the external terminal device. A user can operate the external terminal device to control a color gamut range of a displayed image projected by the display device.

Figure 5:
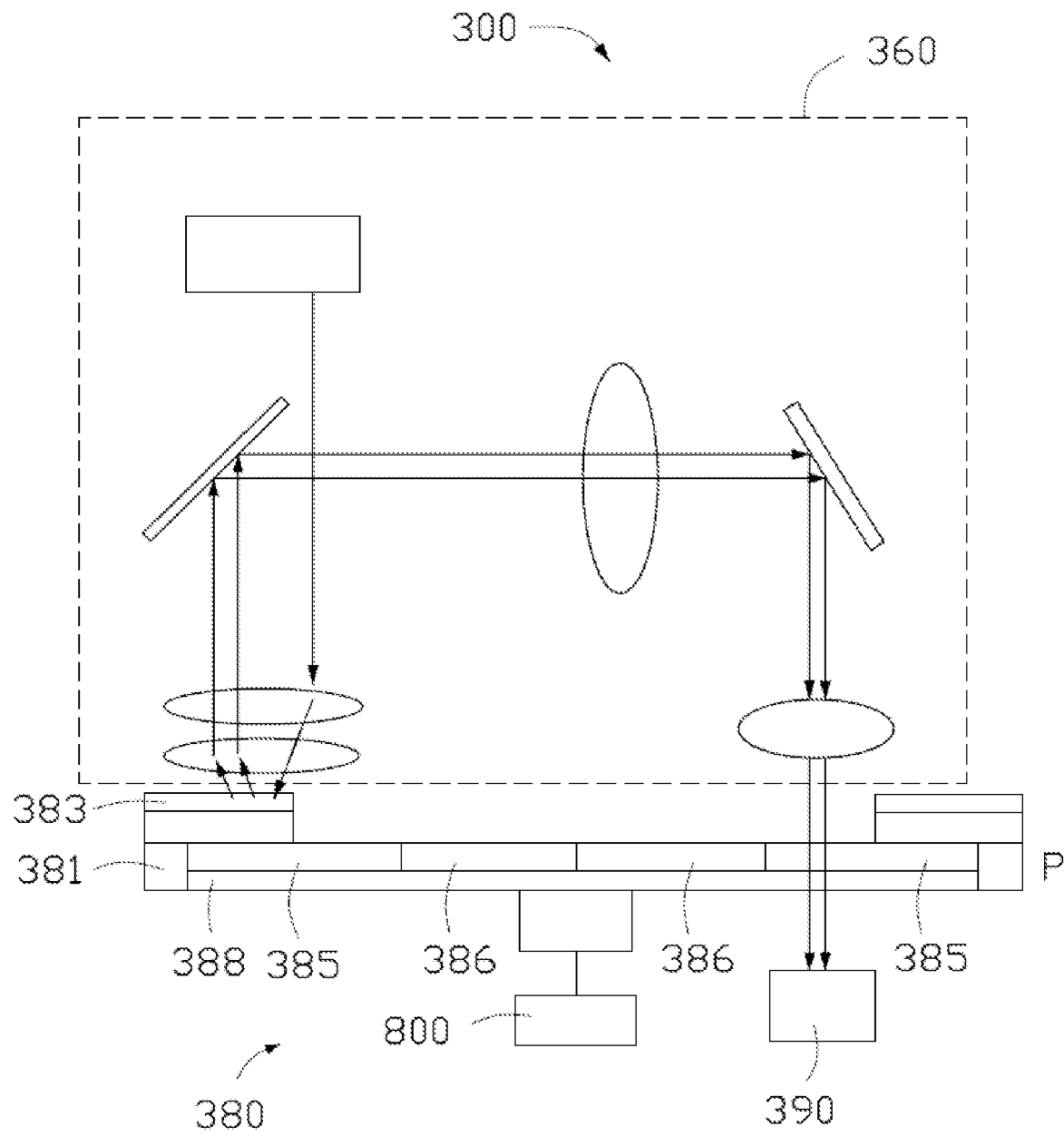
FIG. 5 is a schematic diagram of a light source system and a control apparatus shown in FIG. 2 in a second implementation of the present disclosure, in which a color wheel is located at a first position.
Figure 6:
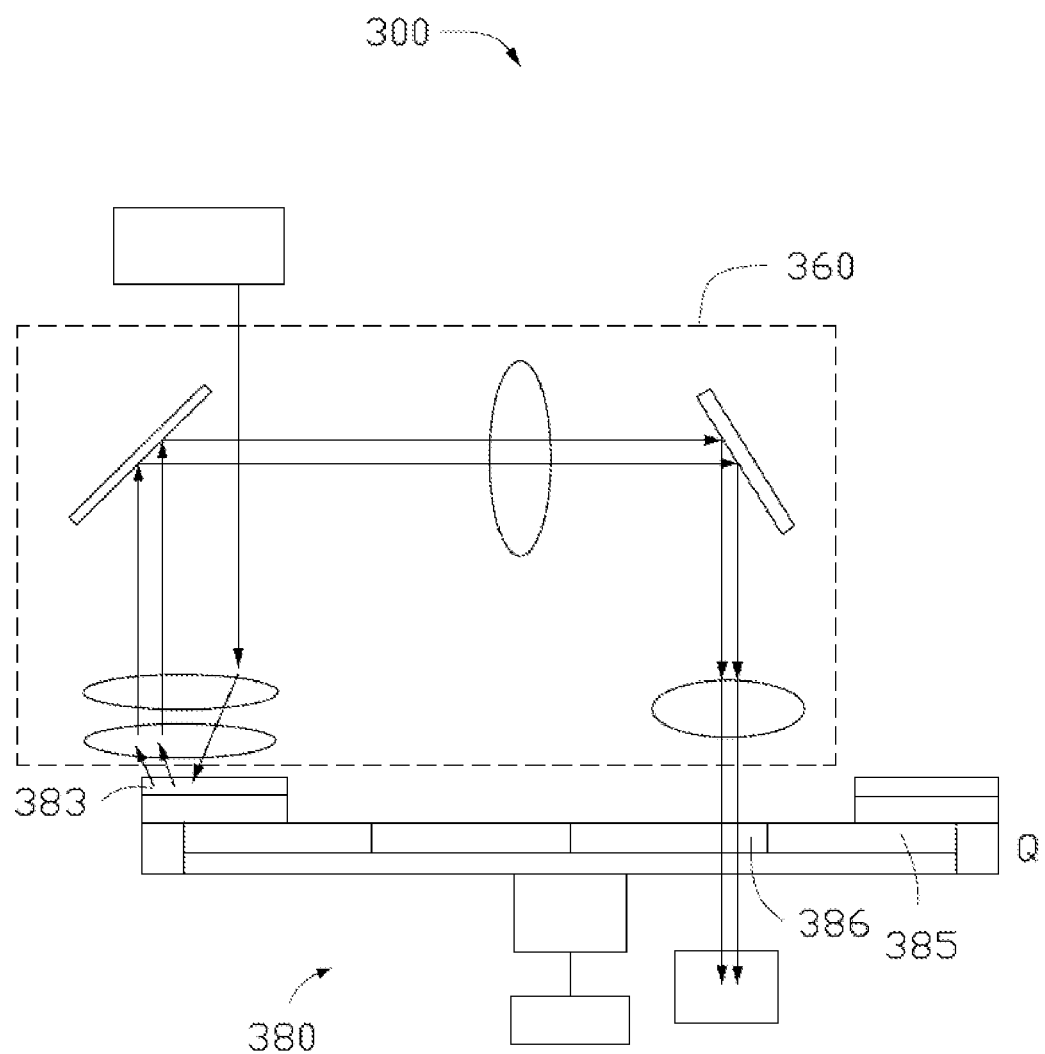
FIG. 6 is a schematic diagram of a light source system and a control apparatus, in which the color wheel shown in FIG. 5 is located at a second position.
Figure 7:
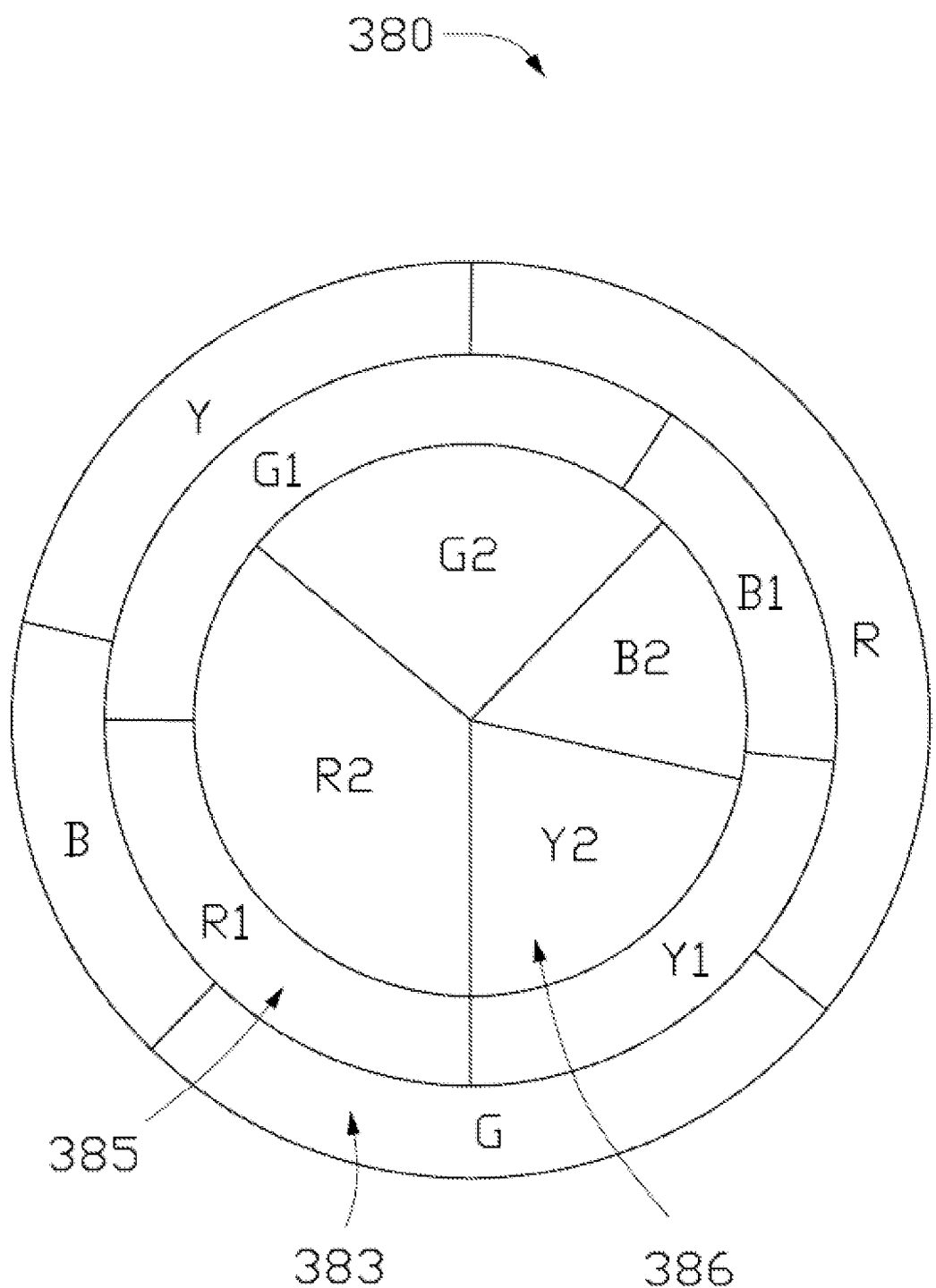
FIG. 7 is a top view of the color wheel shown in FIG. 5.

Referring to FIG. 5 to FIG. 7, in a second implementation of the present disclosure, the light source system 200 in the display device 20 is replaced with a light source system 300. Main differences between the light source system 300 and the light source system 200 are lie in that: the light source system 300 includes a color wheel 380, a first filter layer 385 and a second filter layer 386 that are located on the color wheel 380 are both disposed in a region enclosed by an inner side wall 381b of a substrate 381, and the first filter layer 385 is connected between the substrate 381 and the second filter layer 386. That is, a conversion layer 383 is disposed in an edge region of the color wheel 380, the second filter layer 386 is disposed in a geometric center region of the color wheel 380, and the first filter layer 385 is disposed between the second filter layer 386 and the conversion layer 383. In an implementation, the substrate 381 is circular or in a shape of ring. The first filter layer 285 and the second filter layer 386 are both disposed on a periphery of the substrate 381. In other words, the substrate 381 is disposed at the geometric center of the color wheel 380, and the first filter layer 385 and the second filter layer 386 are located away from the geometric center of the color wheel 380 relative to the substrate 381.

As shown in FIG. 5 and FIG. 6, the first filter layer 385 and the second filter layer 386 are connected to an antireflection film 388 through a colloid. The colloid can be a nonopaque optical adhesive, to transmit light to the homogenizing apparatus 390. Correspondingly, a driving unit 389 on the color wheel 380 is disposed on a surface of the antireflection film 388 facing away from the conversion layer 383, and is configured to drive the color wheel 380 to rotate periodically.

Further, the movement data transmitted by the control apparatus 800 is used to control the color wheel 380 to move to a first position P or a second position Q. When the color wheel is located at the first position P, the guiding assembly 360 guides excited light and scattered exciting light to be incident to the first filter layer 385 to obtain first light. When the color wheel 380 is located at the second position Q, the guiding assembly 360 guides excited light and scattered exciting light to be incident to the second filter layer 386 to obtain second light.

In an implementation, the conversion layer 383 is provided with only a yellow phosphor, to convert incident exciting light into yellow fluorescence for emission. The light source system 300 is further provided with a supplementary light source for emitting supplementary light. The supplementary light is emitted from the light source system 300 along a same optical path as the first light and the second light. For example, blue supplementary light, the first light and the second light are all incident to the homogenizing apparatus 390 and then emitted.

In this implementation, the control apparatus 800 generates a movement signal according to a trigger signal, to control displacement of the color wheel 380 to change the optical path, so that the color wheel 380 emits light of a plurality of types of color gamut in a same color wheel structure, thereby optimizing the color of the light emitted by the light source system 300, and improving user viewing experience. In addition, the optical distance of the light source system 300 is relatively short, thereby improving light energy utilization and reducing a volume of the optical path, with a favorable market prospect.

Figure 8:
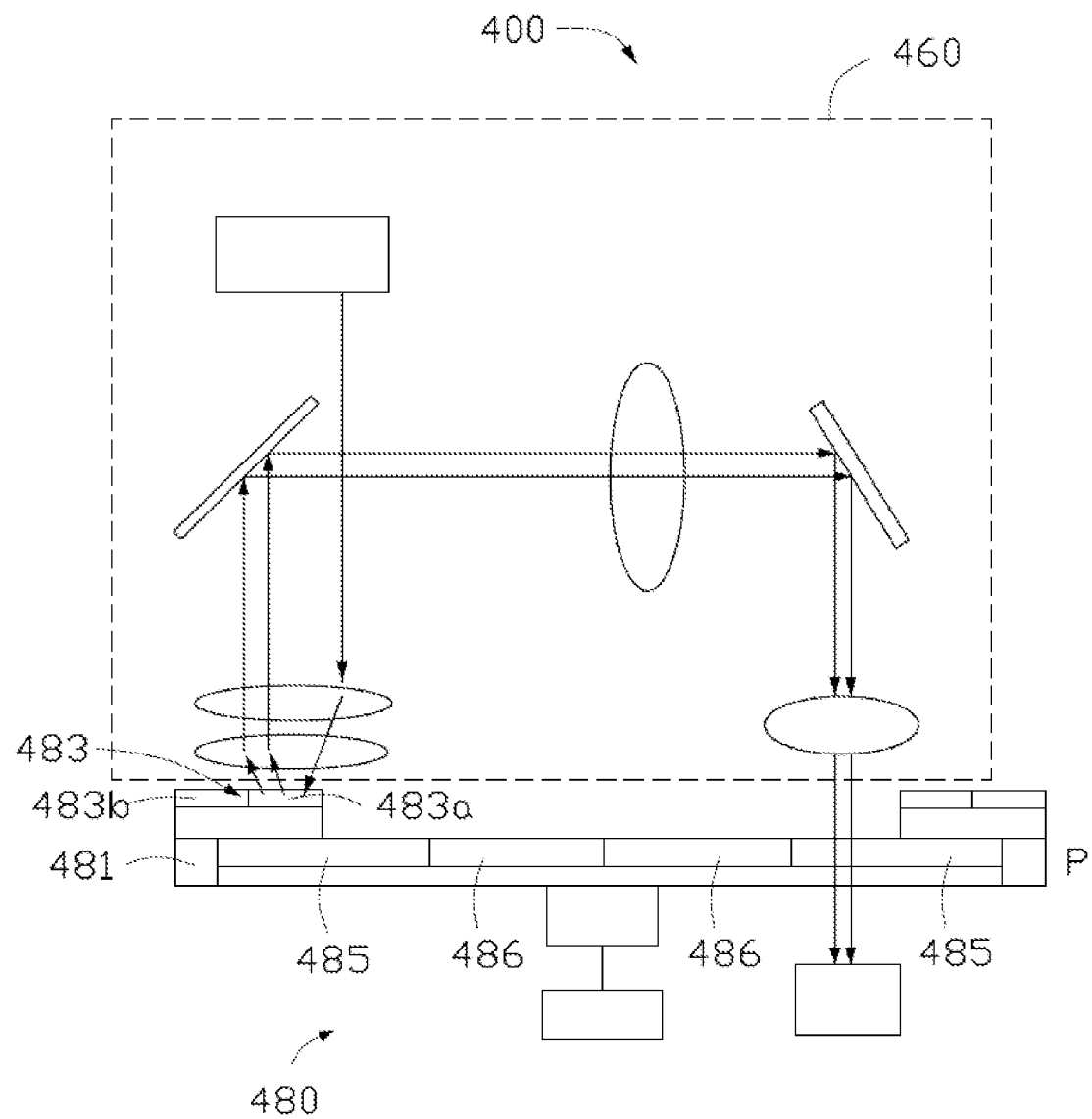
FIG. 8 is a schematic diagram of a light source system and a control apparatus shown in FIG. 2 in a third implementation, in which a color wheel is located at a first position.
Figure 9:
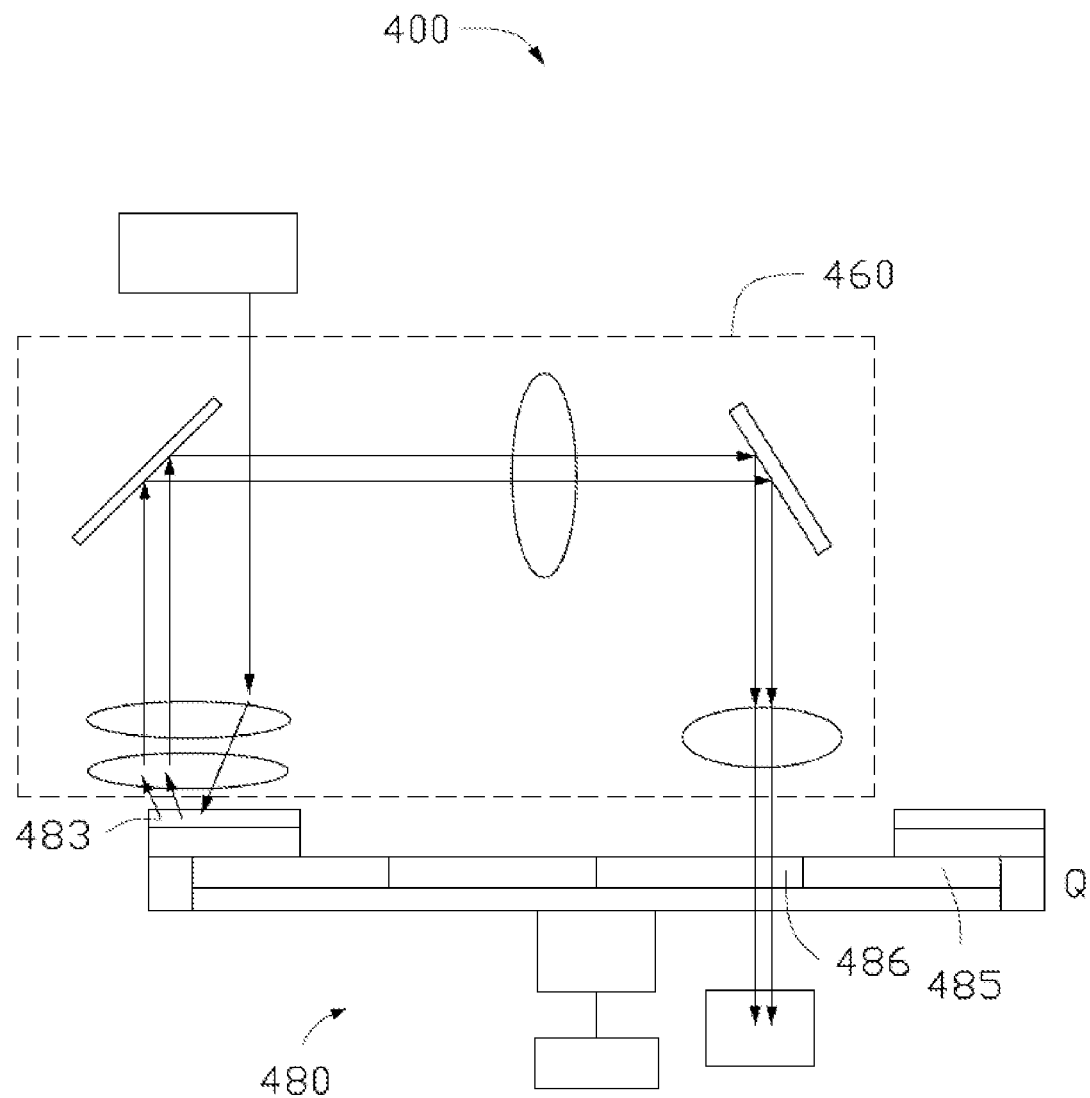
FIG. 9 is a schematic diagram of a light source system and a control apparatus, in which the color wheel shown in FIG. 8 is located at a second position.
Figure 10:
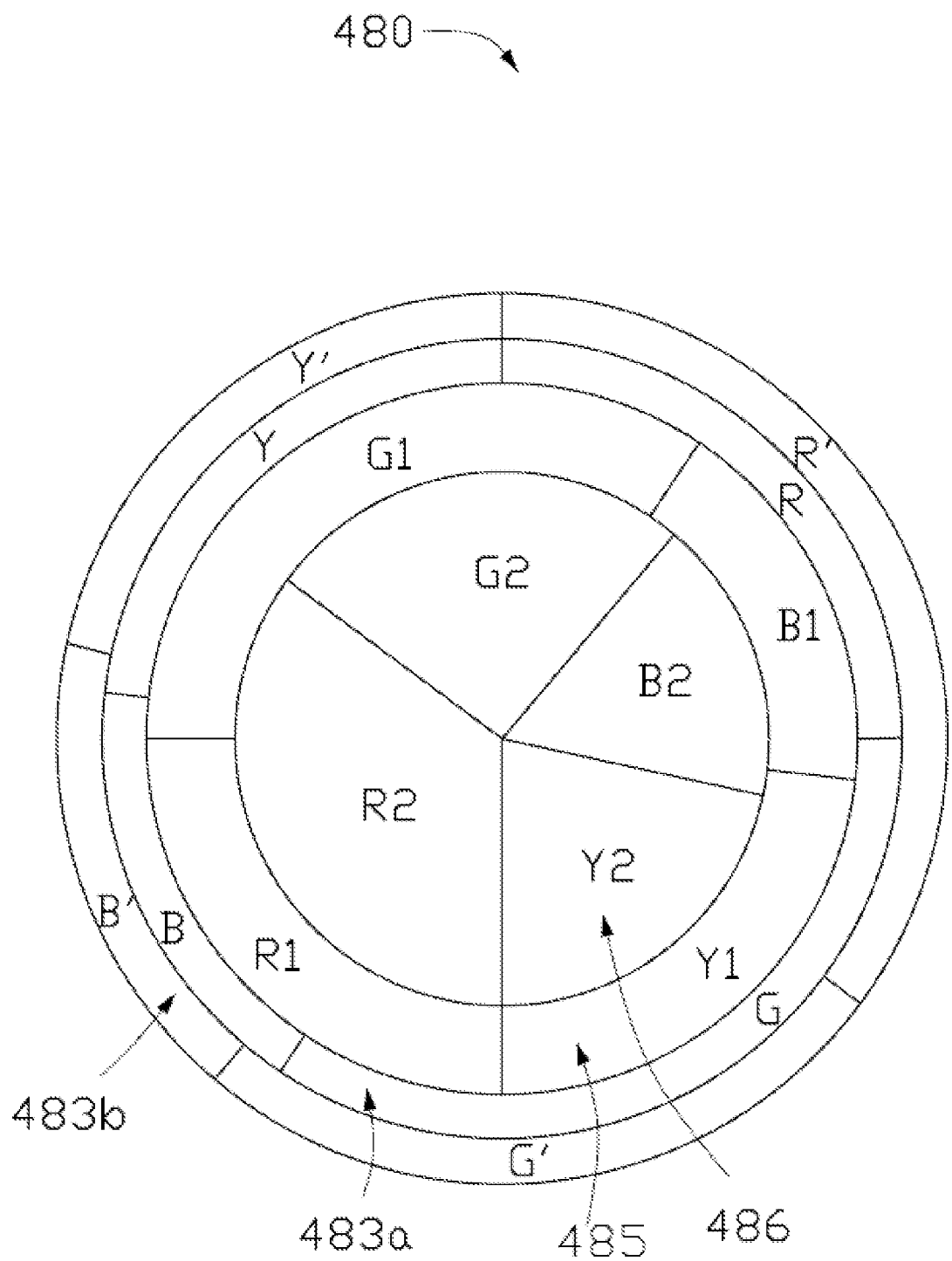
FIG. 10 is a top view of the color wheel shown in FIG. 8.

Referring to FIG. 8 to FIG. 10, in a third implementation of the present disclosure, the light source system 200 in the display device 20 is replaced with a light source system 400. Main differences between the light source system 400 and the light source system 300 lie in that: a color wheel 480 in the light source system 400 includes a conversion layer 483, and the conversion layer 483 includes a first conversion layer 483a and a second conversion layer 483b. The first conversion layer 483a and the second conversion layer 483b are adjacently disposed side by side. The first conversion layer 483a is closer to a first filter layer 485 than the second conversion layer 483b. In another implementation, the first conversion layer 483a and the second conversion layer 483b can be spaced apart from each other. Preferably, a plane of the first conversion layer 483a and a plane of the second conversion layer 483b are parallel to each other or located in a same plane. This facilitates sharing of other devices in the light source system 400, and simplifies the design of an optical path.

The first conversion layer 483a is configured to emit first excited light, and the first excited light is filtered by the first filter layer 485 to obtain first light. The second conversion layer 483b is configured to emit second excited light, and the second excited light is filtered by the second filter layer 486 to obtain second light. That is, the light emitted by the first conversion layer 483a is used to modulate an image in a first color gamut, and the light emitted by the second conversion layer 483b is used to modulate an image in a second color gamut. Therefore, wavelength conversion materials provided in the first conversion layer 483a and the second conversion layer 483b can be selected according to a first color gamut standard and a second color gamut standard, respectively.

Correspondingly, the first conversion layer 483a and the second conversion layer 483b are each provided with a plurality of sections for emitting light of different colors. The sections in the first conversion layer 483a and the second conversion layer 483b are set in the same manner as sections in the conversion layer 283. For example, the first conversion layer 483a is provided with a first section R, a second section G, a third section Y and a fourth section B. The first section R, the second section G, the third section Y and the fourth section B are used to emit first color light, second color light, third color light and fourth color light, respectively. The second conversion layer 483b is provided with a first section R', a second section G', a third section Y' and a fourth section B'. The first section R', the second section G', the third section Y' and the fourth section B' are used to emit first color light, second color light, third color light and fourth color light, respectively.

The first conversion layer 483a and the second conversion layer 483b include the first section R and the first section R' for emitting the first color light, respectively. Different types of color gamut have different requirements on proportions of light of different colors. Therefore, a central angle of the first section R and a center angle of the first section R' are not equal to each other, the central angle of the first section R and a central angle of the first section R1 are equal to each other, and central angles of the first section R' and the first section R2 are equal to each other. In the light source system 400 shown in FIG. 7, a central angle of each section in the first conversion layer 483a and a central angle of a section of a corresponding color in the first filter layer 485 are symmetrical along a geometric center of the substrate 481, that is, central angles of the first section R and the first section R1 are symmetrically arranged with respect to the geometric center of the substrate 481. A central angle of each section in the second conversion layer 483b and a central angle of a section of a corresponding color in the second filter layer 486 are symmetrical along the geometric center of the substrate 481, that is, central angles of the first section R' and the first section R2 are symmetrically arrange with respect to the geometric center of the substrate 481.

Correspondingly, when the color wheel 480 is located at the first position P, the guiding assembly 460 guides exciting light to irradiate the first conversion layer 483a to obtain first excited light, and guides the first excited light to be incident to the first filter layer 485 to obtain the first light. When the color wheel 480 is located at the second position Q, the guiding assembly 460 guides exciting light to irradiate the second conversion layer 483b to obtain second excited light, and guides the second excited light to be incident to the second filter layer 486 to obtain the second light.

Figure 11:
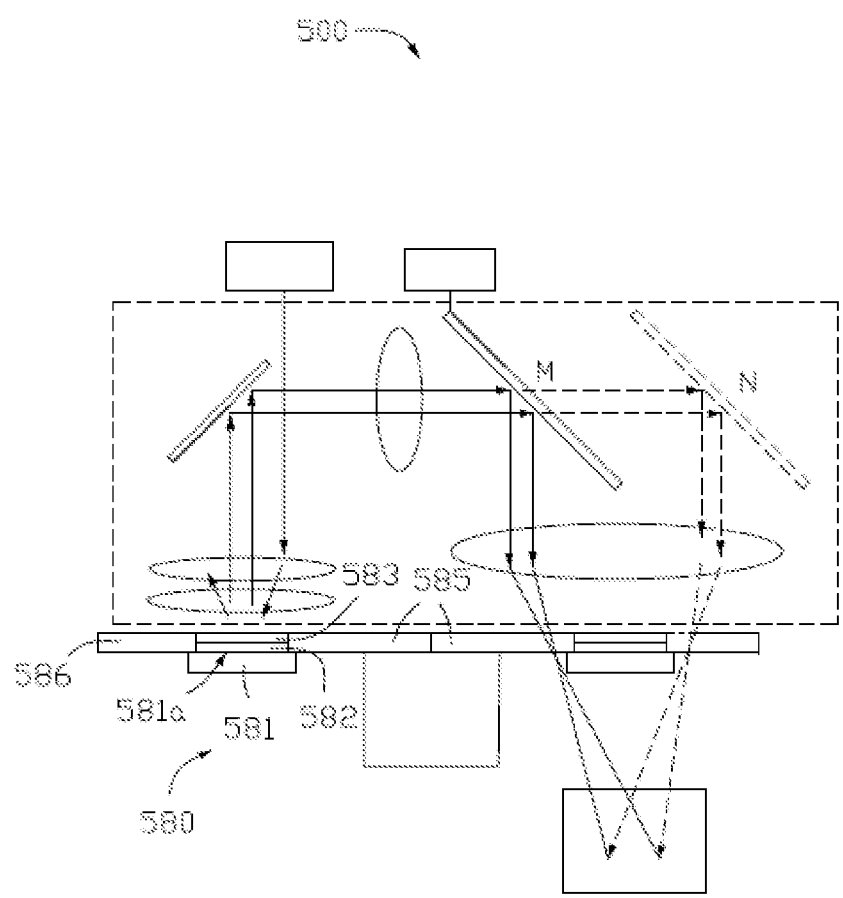
FIG. 11 is a schematic diagram of a light source system and a control apparatus shown in FIG. 2 in a fourth implementation of the present disclosure, where a color wheel is located at a first position.

Referring to FIG. 11, in a fourth implementation of the present disclosure, the light source system 200 in the display device 20 is replaced with a light source system 500. Main differences between the light source system 500 and the light source system 200 lie in that: the light source system 500 includes a color wheel 580, and a substrate 581 of the color wheel 580 is provided with a conversion layer 583, a first filter layer 585 and a second filter layer 586. A plane of a light incident surface of the conversion layer 583, a plane of a light incident surface of the first filter layer 585 and a plane of a light incident surface of the second filter layer 586 overlap. In other words, light incident surfaces of the conversion layer 583, the first filter layer 585 and the second filter layer 586 is located in a same plane.

Specifically, the substrate 581 includes a top surface 581a, the first filter layer 585 and the second filter layer 586 are respectively disposed on two opposite ends of the top surface 581a, and the conversion layer 583 is connected to a middle region of the top surface 581a through a reflective layer 582. The light incident surfaces of the conversion layer 583, the first filter layer 585 and the second filter layer 586 are parallel to the top surface 581a. In addition, a distance from the light incident surface of the conversion layer 583 to the top surface 581a is equal to a distance from the light incident surface of the first filter layer 585 to the top surface 581a, and a distance from the light incident surface of the first filter layer 585 to the top surface 581a is equal to a distance from the light incident surface of the second filter layer 586 to the top surface 581a. In an implementation, the substrate 581 is a transparent substrate.

It can be understood that, in the second implementation and the third implementation of the present disclosure, the light incident surface of the conversion layer, the light incident surface of the first filter layer and the light incident surface of the second filter layer can be located in a same plane. In an implementation, the conversion layer, the first filter layer and the second filter layer are connected to the top surface of the substrate directly or connected to the top surface of the substrate by using another layer structure.

It should be noted that within the scope of the spirit or basic features of the present disclosure, the technical solutions in the implementations are mutually applicable, and for brevity and in order to avoid repetition, details are not described herein again.

For a person skilled in the art, it is apparent that the present disclosure is not limited to the details of the foregoing exemplary embodiments, and that the present disclosure can be implemented in other specific forms without departing from the spirit or basic features of the present disclosure. Therefore, the embodiments should be regarded as exemplary and non-limiting in every respect, and the scope of the present disclosure is defined by the appended claims rather than the above description. Therefore, all changes falling within the meaning and scope of equivalent elements of the claims should be included in the present disclosure. Any reference numerals in the claims should not be considered as limiting the claims involved. In addition, it is apparent that the word "including" does not exclude other units or steps, and a singular number does not exclude a plural number. A plurality of apparatuses stated in the apparatus claims can also be implemented by a same apparatus or system through software or hardware. Words such as first and second are used to denote names and do not indicate any particular order.

Finally, it should be noted that the foregoing embodiments are only intended to describe, rather than to limit the technical solutions of the present disclosure. Although the present disclosure is described in detail with reference to the preferred embodiments, a person of ordinary skill in the art should understand that modifications or equivalent replacements can be made to the technical solutions of the present disclosure without departing from the spirit and scope of the technical solutions of the present disclosure.

What is claimed is:
1. A color wheel, comprising:
   a substrate; and
   a conversion layer, a first filter layer, and a second filter layer that are disposed on the substrate,
   wherein the conversion layer is configured to perform wavelength conversion on incident light to obtain excited light, the first filter layer is configured to filter all the excited light to obtain first light for modulating an image in a first color gamut range, and the second filter layer is configured to filter all the excited light to obtain second light for modulating an image in a second color gamut range;
   wherein a plane of a light incident surface of the conversion layer, a plane of a light incident surface of the first filter layer, and a plane of a light incident surface of the second filter layer are parallel to or overlap with each other; and wherein each of the first filter layer and the second filter layer comprises a plurality of sections, each of the plurality of sections is configured to filter excited light of a same color to obtain first light or second light of a corresponding color, a bandwidth of a transmittance rate curve of one of the plurality of sections of the first filter layer configured to filter excited light of a same color is a first bandwidth, a bandwidth of a transmittance rate curve of one of the plurality of sections of the second filter layer configured to filter excited light of a same color is a second bandwidth, and the first bandwidth is wider than the second bandwidth.

2. The color wheel according to claim 1, wherein a reflective layer for reflecting light is provided between the conversion layer and the substrate.

3. The color wheel according to claim 2, wherein the substrate has an annular shape, and comprises a top surface provided with the conversion layer and the reflective layer, and an inner side wall and an outer side wall that are connected to the top surface and the inner side wall and the outer side wall are opposite to each other.

4. The color wheel according to claim 3, wherein each of the first filter layer and the second filter layer comprises a first section for filtering first color light in the excited light, and a central angle of the first section of the first filter layer is not equal to a central angle of the first section of the second filter layer.

5. The color wheel according to claim 4, wherein the first filter layer is disposed in a region enclosed by the inner side wall of the substrate, and the second filter layer is disposed on a periphery of the outer side wall of the substrate.

6. The color wheel according to claim 4, wherein the first filter layer and the second filter layer are both disposed in a region enclosed by the inner side wall of the substrate, and the first filter layer is connected between the substrate and the second filter layer.

7. The color wheel according to claim 6, wherein an antireflection film is provided on a side of the second filter layer facing away from the conversion layer.

8. The color wheel according to claim 6, wherein the conversion layer comprises:
a first conversion layer configured to emit first excited light, wherein the first light is obtained by filtering the first excited light by the first filter layer; and a second conversion layer configured to emit second excited light, wherein the second light is obtained by filtering the second excited light by the second filter layer.

9. The color wheel according to claim 8, wherein each of the first conversion layer and the second conversion layer comprises a first section for emitting the first color light, a central angle of the first section of the first conversion layer is equal to the central angle of the first section of the first filter layer, and a central angle of the first section of the second conversion layer is equal to the central angle of the first section of the second filter layer.

10. The color wheel according to claim 9, wherein the central angle of the first section of the first conversion layer and the central angle of the first section of the first filter layer are symmetrically arranged with respect to a geometric center of the substrate, and the central angle of the first section of the second conversion layer and the central angle of the first section of the second filter layer are symmetrically arranged with respect to the geometric center of the substrate.

11. A light source system, comprising:
an exciting light source configured to emit exciting light;
a color wheel; and
a guiding assembly,
wherein the color wheel comprises a substrate, and a conversion layer, a first filter layer, and a second filter layer that are disposed on the substrate,
wherein the conversion layer is configured to perform wavelength conversion on incident light to obtain excited light, the first filter layer is configured to filter all the excited light to obtain first light for modulating an image in a first color gamut range, and the second filter layer is configured to filter all the excited light to obtain second light for modulating an image in a second color gamut range; and
wherein a plane of a light incident surface of the conversion layer, a plane of a light incident surface of the first filter layer, and a plane of a light incident surface of the second filter layer are parallel to or overlap with each other,
wherein each of the first filter layer and the second filter layer comprises a plurality of sections, each of the plurality of sections is configured to filter excited light of a same color to obtain first light or second light of a corresponding color, a bandwidth of a transmittance rate curve of one of the plurality of sections of the first filter layer configured to filter excited light of a same color is a first bandwidth, a bandwidth of a transmittance rate curve of one of the
plurality of sections of the second filter layer configured to filter excited light of a same color is a second bandwidth, and the first bandwidth is wider than the second bandwidth.

12. The light source system according to claim 11, wherein the exciting light irradiates the conversion layer to obtain the excited light; and
the guiding assembly is a mirror configured to move to a first position or a second position based on a movement signal, wherein when the mirror is located at the first position, the mirror guides the excited light to be incident to the first filter layer to obtain the first light; and when the mirror is located at the second position, the mirror guides the excited light to be incident to the second filter layer to obtain the second light.

13. The light source system according to claim 11, wherein the exciting light irradiates the conversion layer to obtain the excited light;
the guiding assembly configured to guide the excited light to be incident to the first filter layer or the second filter layer; and
the color wheel further moves to a first position or a second position based on a movement signal; when the color wheel is located at the first position, the guiding assembly guides the excited light to be incident to the first filter layer to obtain the first light; and when the color wheel is located at the second position, the guiding assembly guides the excited light to be incident to the second filter layer to obtain the second light;
a reflective layer for reflecting light is provided between the conversion layer and the substrate;
the substrate has an annular shape, and comprises a top surface provided with the conversion layer and the reflective layer, and an inner side wall and an outer side wall that are connected to the top surface and the inner side wall and the outer side wall are opposite to each other;

each of the first filter layer and the second filter layer comprises a first section for filtering first color light in the excited light, and a central angle of the first section of the first filter layer is not equal to a central angle of the first section of the second filter layer;

the first filter layer and the second filter layer are both disposed in a region enclosed by the inner side wall of the substrate, and the first filter layer is connected between the substrate and the second filter layer.

14. The light source system according to claim 13, wherein the light source system further comprises a supplementary light source for emitting supplementary light, wherein the supplementary light is emitted from the light source system along a same optical path as the first light and the second light.

15. A display device, comprising:
  a control apparatus configured to transmit a movement signal based on a trigger signal and transmit a modulation signal based on image data of each of frames of an image to be displayed;
  a light source system configured to emit the first light or the second light based on the movement signal, wherein the light source system comprises an exciting light source configured to emit exciting light, a color wheel, and a guiding assembly;
  wherein the color wheel comprises a substrate, and a conversion layer, a first filter layer, and a second filter layer that are disposed on the substrate; wherein the conversion layer is configured to perform wavelength conversion on incident light to obtain excited light, the first filter layer is configured to filter the excited light to obtain first light for modulating an image in a first color gamut range, and the second filter layer is configured to filter the excited light to obtain second light for modulating an image in a second color gamut range; and wherein a plane of a light incident surface of the conversion layer, a plane of a light incident surface of the first filter layer, and a plane of a light incident surface of the second filter layer are parallel to or overlap with each other; and a light modulation apparatus configured to modulate the first light or the second light based on the modulation signal to obtain image light of the image to be displayed.

16. The light source system according to claim 11, wherein a reflective layer for reflecting light is provided between the conversion layer and the substrate;

the substrate has an annular shape, and comprises a top surface provided with the conversion layer and the reflective layer, and an inner side wall and an outer side wall that are connected to the top surface and the inner side wall and the outer side wall are opposite to each other;

each of the first filter layer and the second filter layer comprises a first section for filtering first color light in the excited light, and a central angle of the first section of the first filter layer is not equal to a central angle of the first section of the second filter layer;

the first filter layer and the second filter layer are both disposed in a region enclosed by the inner side wall of the substrate, and the first filter layer is connected between the substrate and the second filter layer;

the conversion layer comprises:

a first conversion layer configured to emit first excited light, wherein the first light is obtained by filtering the first excited light by the first filter layer, and a second conversion layer configured to emit second excited light, wherein the second light is obtained by filtering the second excited light by the second filter layer;

the guiding assembly configured to guide the exciting light to irradiate the conversion layer, and guide the excited light to be incident to the first filter layer or the second filter layer;

wherein the color wheel further moves to a first position or a second position based on a movement signal;

when the color wheel is located at the first position, the guiding assembly guides the exciting light to irradiate the first conversion layer to obtain the first excited light, and guides the first excited light to be incident to the first filter layer to obtain the first light; and when the color wheel is located at the second position, the guiding assembly guides the exciting light to irradiate the second conversion layer to obtain the second excited light, and guides the second excited light to be incident to the second filter layer to obtain the second light.

17. The light source system according to claim 11, wherein the second color gamut range covers the first color gamut range and has a part beyond the first color gamut range.

* * * * *